United States Patent [19]
Cox

[11] Patent Number: 4,719,538
[45] Date of Patent: Jan. 12, 1988

[54] FORCE RESPONSIVE CAPACITIVE TRANSDUCER

[76] Inventor: John D. Cox, 81 Tremont St., Cambridge, Mass. 02139

[21] Appl. No.: 936,893

[22] Filed: Dec. 2, 1986

[51] Int. Cl.⁴ .............................................. G01L 9/12
[52] U.S. Cl. .................................................... 361/283
[58] Field of Search ................... 361/283; 73/718, 724

[56] References Cited

U.S. PATENT DOCUMENTS

| | | | |
|---|---|---|---|
| 2,907,320 | 10/1959 | DeWeese et al. | 73/718 X |
| 3,859,575 | 1/1975 | Lee et al. | 73/724 X |
| 4,295,376 | 10/1981 | Bell | 73/724 |
| 4,433,580 | 2/1984 | Tward | 361/283 X |

Primary Examiner—Donald Griffin

[57] ABSTRACT

A capacitive transducer includes a plurality of first electrodes which, together with at least one second electrode, define a plurality of capacitors having capacitance variable with spacing. An actuator element connected to a plate supporting at least one second electrode angularly deflects the plate. This angular deflection causes the spacing, and thus the capacitance, of electrode sets disposed on opposite sides of the center of the plate to vary in a differential manner.

13 Claims, 8 Drawing Figures

FORCE RESPONSIVE CAPACITIVE TRANSDUCER

BACKGROUND OF THE INVENTION

The present invention relates to force-sensitive transducers, and more particularly, to force-sensitive transducers which function as hand-operated controllers for a variety of applications such as machine tools, computer terminal cursor controllers, remote vehicle controls and other devices.

Ergonomic studies have demonstrated that force-responsive controllers are preferable to displacement-responsive controllers for a wide range of applications. Force-responsive controllers provide the operator with enhanced control of the transducer apparatus between the operator and the machine being controlled, by responding to finger pressure rather than displacement. In contrast, displacement-responsive joystick controllers give less positive control, and frequently suffer from excessive backlash as well as lack of tactile feedback in the area around the spring-loaded neutral position.

Force transducers employing capacitive sensing are known in the art. The following U.S. patents are illustrative of recent developments in force-sensitive transducers.

Mehr, U.S. Pat. No. 3,270,260
Lee et al., U.S. Pat. No. 3,859,575
Bell, U.S. Pat. No. 4,295,376
Sharp et al., U.S. Pat. No. 4,493,219

U.S. Pat. No. 3,270,260 to Mehr discloses a stick-operated controller utilizing a semi-rigid conductive diaphragm responsive to forces applied to the stick. The diaphragm, together with pickup plates separated from the parallel to the diaphragm, defines capacitors having capacitance varying as a function of diaphragm-to-pickup plate spacing. The Mehr device accordingly measures force applied to the stick by measuring the out-of-plane deflection of the diaphram.

U.S. Pat. No. 3,859,575 to Lee discloses a capacitive transducer having a flexible diaphragm deflectable in response to forces applied in a direction normal to the plane of the diaphragm.

Pat. No. U.S. 4,295,376 to Bell discloses a capacitive transducer having an electrode-carrying diaphragm responsive to forces which act in a direction normal to the diaphragm's plane of repose, causing the diaphragm to assume a dome-like shape. The diaphragm is fixed by a peripheral mount. An intermediate spacer element, disposed concentrically within the peripheral mount, provides support for a rigid reference plate which carries a pair of reference electrodes. Because the spacer element is affixed to a flexible portion of the diaphragm, special construction of the spacer element is required to prevent constraint of the diaphragm by the spacer element.

In the Bell device deflection is measured in the two radially symmetric diaphragm regions delimited by the spacer element and the peripheral mount. The pair of reference electrodes separated from the diaphragm-mounted electrodes define, together with the diaphragm-mounted electrodes, capacitors having capacitance variable with diaphragm-to-reference gaps. The Bell device accordingly measures normal force applied to the diaphragm, by measuring out-of-plane deflection of the diaphragm.

U.S. Pat. No. 4,493,219 to Sharp discloses a energy conversion and transmission device utilizing a joystick connected to a plurality of elastic pads, in connection with capacitive transducing elements.

Prior art force transducers like that disclosed in Mehr suffer from poor sensitivity to user input. This poor senstivity is due to the prior art approach of measuring the out-of-plane deflection of the diaphragm. The out-of-plane deflection of the diaphragm is small, and the area of maximum deflection of the diaphragm is limited. In the Mehr device, for example, deflection of the diaphragm is greatest near the central region of the diaphragm, where the area available for the measuring capacitors is small.

Prior art capacitive transducers also suffer from the disadvantage of high impedance for a given gap dimension. Smaller gap sizes have been used in an attempt to reduce impedance, and especially, to increase sensitivity, but smaller gap sizes result in critical alignment requirements. Additionally, proper alignment of the capacitive elements in prior art transducers is difficult to achieve, in view of such transducers' complex construction, small gap dimensions and parallelism requirements.

There accordingly exists a need for a force-sensitive transducer having enhanced sensitivity to force input, reduced impedance, minimal alignment problems, and simplified construction, which can be constructed at low cost.

SUMMARY OF THE INVENTION

The invention discloses a capacitive transducer having a plurality of first electrodes which, together with at least one second electrode, define a plurality of variable capacitors having capacitance variable with spacing. An actuator element responsive to externally applied force, and connected to a plate supporting at least one second electrode, angularly deflects the plate and at least one second electrode. This angular deflection, or "tilt," causes the spacing of electrode sets disposed on opposite sides of the center of the plate to vary in a differential manner, thus causing the capacitances of the plurality of capacitors to vary in response to applied moment. Restoring force for the tiltable plate is provided by a flexible diaphragm connected to the plate.

The invention further discloses a transducer in which the differentially variable sets of capacitances determine the frequencies of a plurality of oscillators, and the differentially varying frequencies of the oscillators are combined to yield difference frequencies representative of the components of applied moment.

The invention further discloses a microprocessor device integral with a capacitive transducer, for processing signals within the transducer and for generating signals for controlling an external device.

A transducer according to the invention may be fabricated from a wide variety of materials to meet various requirements with respect to linearity of response, environmental stability, cost and ease of manufacture. In particular, the diaphragm material may be chosen for linear elastic properties, low mechanical hysteresis, and for yield modulus, dimensional stability and thermal coefficient match with the supporting structure.

The invention accordingly provides a force-responsive capacitive transducer having high sensitivity to user input, and reduced impedance.

The invention further provides a force-responsive capacitive transducer having simplified construction and alignment, which may be constructed at low cost.

The invention accordingly comprises features of construction, combinations of elements and arrangements of parts exemplified in the constructions hereinafter set forth, and the scope of the invention is illustrated in the claims.

BRIEF DESCRIPTION OF DRAWINGS

For a fuller understanding of the nature and objects of the invention reference should be made to the following detailed description and the accompanying drawings, in which:

FIG. 2 is an isometric cutaway view of the capacitive force transducer of FIG. 1a;

Throughout this description, like reference characters in respective drawing figures are used to indicate corresponding parts.

DESCRIPTION OF ILLUSTRATED EMBODIMENTS

Figure 1A:
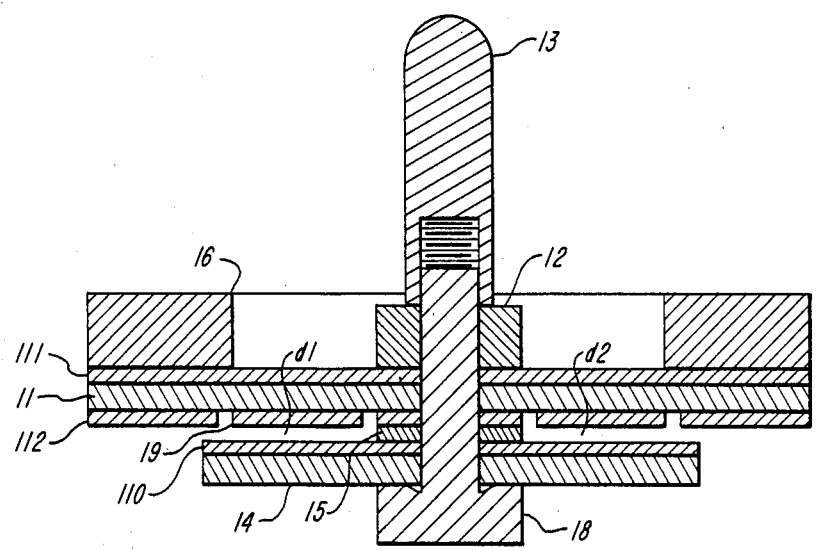
FIG. 1a is a section view of a capacitive transducer according to the invention.

FIG. 1a is a sectional view of a capacitive force transducer according to the present invention. Diaphragm 11 is connected at its periphery to rigid peripheral support 16. Boss 12 is affixed to the center of the outward facing surface of diaphragm 11, and first electrode layer 19 is affixed to the inward facing surface of diaphragm 11. First electrode layer 19 comprises a plurality of electrically isolated electrodes arrayed about the center of diaphragm 11. Shaft 13 is attached to boss 12. Bolt 18 affixes shim 15 and plate 14 to the inward facing surface of diaphragm 11. Plate 14 is accordingly spaced apart from diaphragm 11 by shim 15. Second electrode layer 110 overlies the inward facing surface of plate 14, and defines with the electrodes of first electrode layer 19 a set of substantially parallel plate capacitors whose capacitance is a function of gap dimension, shown in FIG. 1 as d1 and d2.

Flexible diaphragm 11 is preferably a non-conductive rigid-elastic sheet, such as fiberglass reinforced epoxy laminate. Diaphragm 11 supports conductive regions forming the first electrodes, electrical interconnections, guards, shields, and ground planes. The flexible diaphragm 11 may be constructed of other nonconductive materials including glass, glass-ceramic, ceramics, plastics, and other fiber reinforced plastics.

In another embodiment, diaphragm 11 is composed of conductive materials such as steel, aluminum, or phosphor bronze. If the diaphragm is made of a conductive material it will be necessary to electrically isolate the conducting regions comprising the plurality of first electrodes from the diaphragm, using a insulating material such as porcelain on steel, alumina on anodized aluminum, or organic films.

The conductive regions are composed of a gold-plated copper foil. Alternatively, the conductive regions may be metal foils, evaporated or sputtered metal films, conductive inks, or other conductive media known in the art. The rigid plate and associated second electrode elements may be fabricated of similar materials. A region of the diaphragm sheet material may also serve as the printed circuit board substrate for the associated capacitive transduction and interface circuitry, thus reducing manufacturing cost and increasing reliability.

When radial force is applied to shaft 13 by the user, moment is applied to diaphragm 11, resulting in angular deflection of the rigid central region of diaphragm 11. Diaphragm 11, which is affixed at its periphery to rigid support 16 and at its center to boss 12, accordingly assumes the shape shown in exaggerated form in FIG. 1b.

Figure 1B:
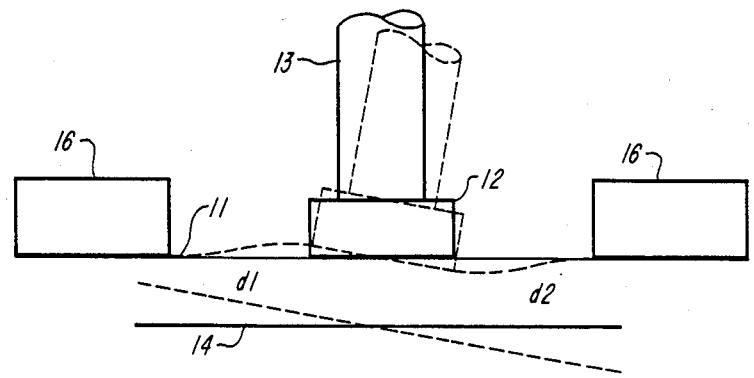
FIG. 1b is a schematic section view of the transducer of FIG. 1a, showing deformation of the diaphragm and deflection of capacitor elements.

FIG. 1b shows the deflection of diaphragm 11 resulting from an applied force acting on shaft 13 from left to right. Deflection in the annular region defined by boss 12 and rigid support 16 causes a cross section of diaphragm 11 to assume the sigmoid form shown in FIG. 1b.

It will be apparent from FIG. 1b that the angular deflection or "tilt" of the central region 12 of diaphragm 11 causes plate 14 to tilt correspondingly. It is the tilt of diaphragm 11 and plate 14 which changes the gap between elements of first electrode layer 19 and elements of second electrode layer 110.

As illustrated in FIG. 1b, because of the tilting of plate 14, the gaps between first and second electrodes change differentially for capacitors corresponding to a given measurement axis and disposed on opposite sides of the center of the diaphragm. For example, in FIG. 1b, gap spacings d1 and d2 have decreased and increased, respectively, from their approximately equal initial values. This differential change in gap dimension between oppositely disposed capacitors corresponding to a given measurement axis yields a differential change in the respective capacitances of such capacitors.

In contradistinction to the prior art transducer disclosed by U.S. Pat. No. 3,270,260 (Mehr), the differential capacitance changes in the transducer according to the invention are of greater magnitude and are of opposite sense, for a given applied force vector, when comparing transducers of similar dimension and materials of construction. This is because in the present invention rigid plate 14 acts as a lever arm, increasing the deflection of second electrode layer 110 located at the periphery of plate 14. The pickup plate of Mehr, in contrast, is not deflectable, and the Mehr transducer does not include a lever element for increasing the range of measurable deflection.

The invention accordingly measures force applied to shaft 13 by measuring the angular deflection of plate 14 as indicated by the differential changes in the capacitances of oppositely disposed capacitors.

Shim 15 provides a simple means for exacting spacing and alignment of first electrode layer 19 and second electrode layer 110.

Ground planes 111 and 112 serve to isolate the measurement electrodes from external electrical fields and other interference. The ground planes are preferably composed of the same materials as constitute the electrode layer 19, and may be fabricated during the same manufacturing operation as electrode layer 19.

Figure 2:
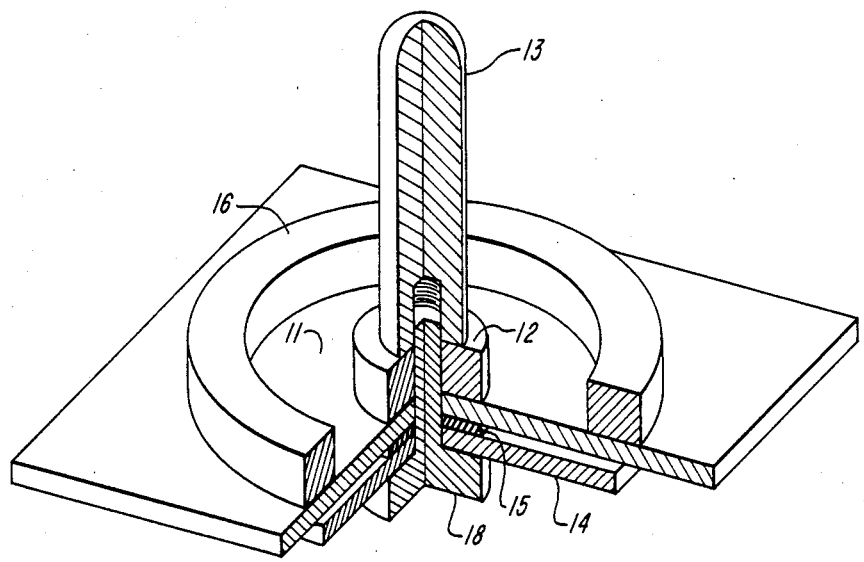

FIG. 2 is an isometric cutaway view of the capacitive force transducer of FIG. 1a, further illustrating the arrangement of the mechanical components. Rigid peripheral support 16 and boss 12 delimit the flexible area of diaphragm 11.

In a preferred embodiment of the invention, diaphragm 11 is circular and 50 mm in diameter, with a rigid central region 12 of 20 mm in diameter. The spacing between diaphragm 11 and rigid plate 14 is established by shim 15 which is 0.1 mm thick, while both diaphragm 11 and plate 14 are 1.5 mm thick.

Shaft 13 may include a sphere or other grip configuration adapted for convenient actuation by the user.

The physical size of the transducer may be varied as may the dimensions of its elements. The dimensions of the transducer and the geometry of its various elements affect such aspects of the transducer as its sensitivity, dynamic range, stability and preferred transduction means. Relatively small gaps in parallel plate capacitor geometries may result in high sensitivities and low impedances that simplify transduction electronics, but small gaps require high accuracy in assembly and good dimensional stability. Larger gap sizes increase range while reducing sensitivity, and favor alternative electrode arrangements and transduction means, such as fringing capacitance. See Richards, J. Phys. E. v. 9, p. 356, (1976). In a fringing capacitive transducer, however, the resulting terminal impedances may be very high, requiring greater complexity in electronic circuitry.

Figure 3:
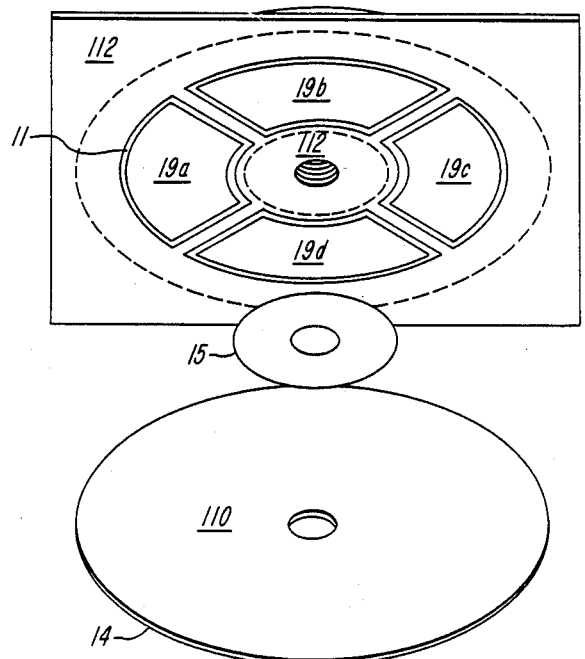
FIG. 3 is a partly exploded isometric view of the transducer of FIG. 1a, giving detail of an electrode configuration.

FIG. 3 is a partly exploded isometric view of the capacitive transducer of FIG. 1a, giving detail of the electrode geometry. First electrode layer 19 comprises electrodes 19a-19d, with each pair of oppositely disposed electrodes being used to measure force along a given measurement axis. For example, electrodes 19a and 19c in part define a pair of capacitors which are used to measure components of force acting along an X-axis, and electrodes 19b and 19d in part define a pair of capacitors which are used to measure components of force acting along a Y-axis. Electrodes 19a-19a are electrostatically shielded from each other by ground plane 112 which acts in part as a guard electrode structure. Electrical interconnections for electrodes 19a-19d and transduction circuitry may be affixed to diaphragm 11. For clarity, such interconnection circuitry is omitted from FIG. 3.

Figure 4A:
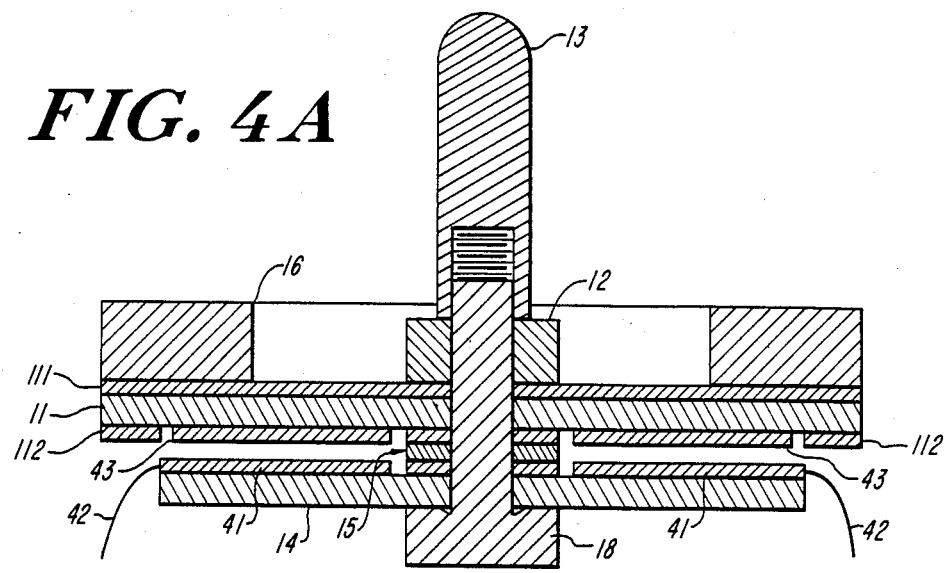
FIG. 4a is a section view of another embodiment of the present invention.

FIG. 4a is a sectional view of another embodiment of the invention. In this embodiment, transducer 40 includes a second electrode layer 41. Electrode layer 41 has a plurality of electrodes 41a-d, each having an independent connection to associated measurement circuitry via flexible leads 42a-d, respectively. The independent arrangement of electrodes 41a-d permits a variety of alternative measurement circuitry. For example, the capacitor sets can be connected as impedance bridge circuits, in a manner known in the art. First electrodes 43a and 43b extend beyond the flexible region of diaphragm 11 and, with second electrodes 41a and 41d also extending beyond the flexible region of diaphragm 11, provide greater area for the corresponding variable capacitors, reducing transducer impedance. The increased dimensions of these features with respect to the flexible region of the diaphragm, also increases the deflection of the peripheral regions of the second electrodes, resulting in greater capacitance change for a given applied moment. Moreover, first electrode layer 43 may in this embodiment comprise a single electrode area, rather than a plurality of electrodes. This feature of the invention is conveniently utilized in a construction wherein the diaphragm is composed of a conductive material.

Figure 4B:
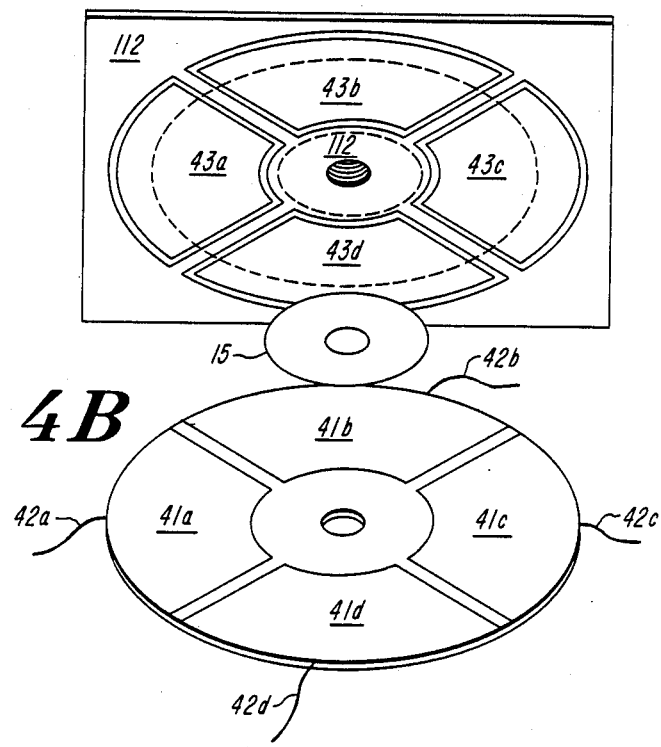
FIG. 4b is a partly exploded view from below of the transducer of FIG. 4a, giving detail of an electrode configuration.

FIG. 4b is a partly exploded view from below of the transducer of FIG. 4a, giving detail of the arrangement of second electrodes 41a-d and plate 14. FIG. 4b shows a top view of rigid plate 14 with associated electrode layer, and a bottom view of diaphragm 11 and associated components. Electrical interconnections for electrodes 19a-19d and transduction circuitry may be affixed to diaphragm 11. For clarity, such interconnection circuitry is omitted from FIG. 4b.

Figure 5:
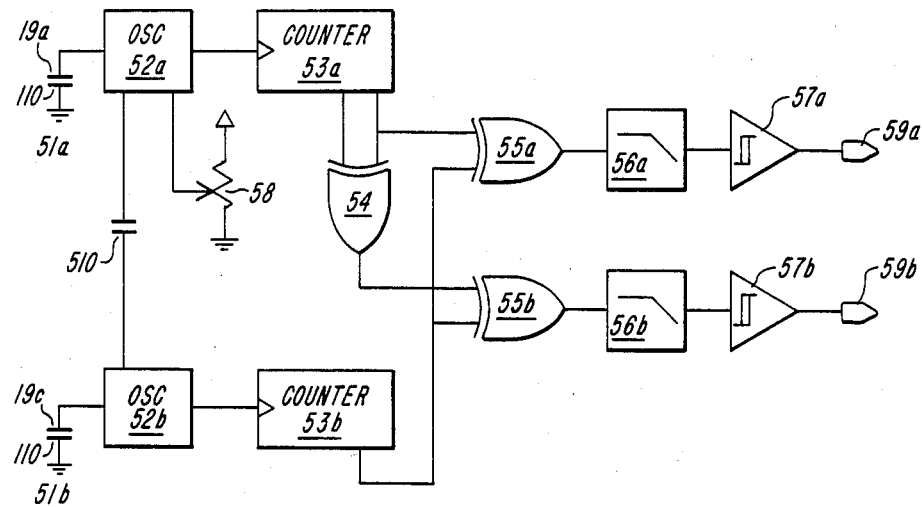
FIG. 5 is a schematic diagram of a signal generating oscillator circuit, utilized in an embodiment of the invention, for output to a digital processor.

FIG. 5 is a schematic diagram of a signal generating circuit, which is employed in another embodiment of the invention, for output to a digital processor. The illustrated circuit provides measurement and signal generating functions for one axis of measurement, in this case, the axis corresponding to the capacitors formed in part by first electrodes 19a and 19c, as illustrated in FIG. 3.

In accordance with the circuit illustrated in FIG. 5, a differentially variable pair of capacitors 51a and 51b formed in part by electrodes 19a and 19c, respectively, determines the frequencies of oscillators 52a and 52b, respectively. Because the frequencies of the pair of oscillators 52a and 52b are determined by the pair of capacitors 51a and 51b which define the X measurement axis, the oscillator frequencies are representative of electrode displacements resulting from moment applied along the X axis. Accordingly, the frequencies of oscillators 52a and 52b vary differentially, as a function of differential variation in electrode gaps d1 and d2 resulting from the component of moment applied along the X measurement axis.

The oscillator frequencies are combined by XOR gates 55a and 55b to yield difference frequencies. A zero output point corresponding to a zero input force is established by adjusting trimmer element 58 so that when no force is applied along the axis of response, the frequencies of oscillator pair 52a and 52b are equal, yielding a difference frequency of zero.

The outputs of oscillators 52a and 52b are connected to digital counters 53a and 53b, respectively, which may vary in modulus so as to vary moment-to-frequency sensitivity. The outputs of counters 53a and 53b preferably have constant duty cycle. XOR gate 54 combines signals from counter 53a to provide a frequency independent quadrature output. The outputs of 53a, 53b and 54 are fed into a complex product detector composed of XOR gates 55a and 55b, and then low pass filtered by low pass filters 56a and 56b to remove the sum frequency and higher order harmonic components.

The resultant difference frequency signals are converted to digital levels by schmitt trigger devices 57a and 57b and appear at the outputs 59a and 59b as square waves, the frequency of which are proportional to the magnitude of the applied moment and the relative phase of which gives the sign of the moment. Such an output signal is directly compatible with quadrature mouse computer input devices.

Oscillators 52a and 52b are weakly phase-locked by mutual coupling capacitor 510. Accordingly, the frequencies of oscillators 52a and 52b remain identical for small variations in capacitors 51a and 51b or variations in the components comprising oscillators 52a and 52b.

Such variations may include, for example, variations in electrical properties caused by changes in temperature.

The weak phase-locking of oscillators 52a and 52b provides hysteresis about the zero point in the moment-to-frequency response. Such hysteresis enhances control of the external device in some applications of the invention. Additionally, the zero output point is stabilized for small variations of the transducer characteristics due to environmental influences.

The magnitude of the hysteresis is determined by the degree of phase locking between oscillators 52a and 52b and may be altered by changes in the coupling circuitry. In alternative embodiments of the invention the phase locking behavior of oscillators 52a and 52b may be obtained by a variety of techniques known in the art, including mutual coupling, injection locking and connection as a phase lock loop (PLL) utilizing voltage-to-frequency input control of the oscillators.

Figure 6:
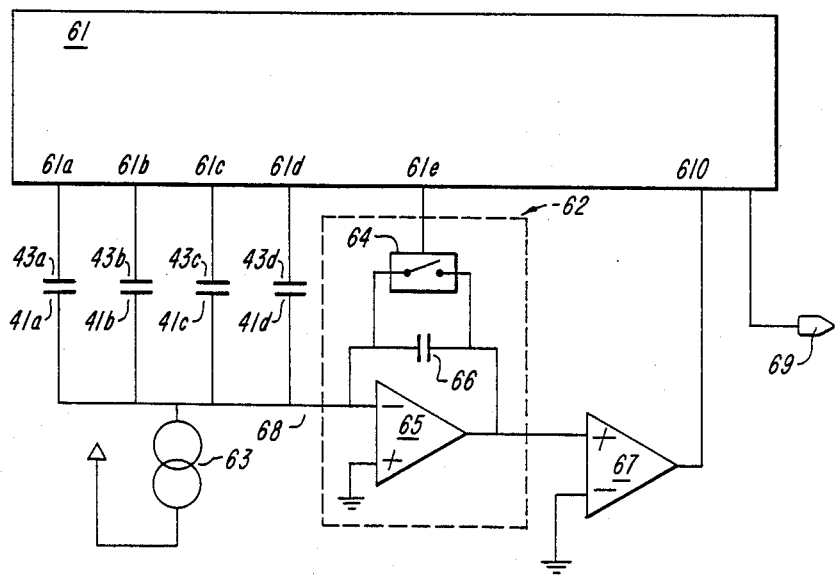
FIG. 6 is a schematic diagram of microprocessor-based circuitry utilized in an embodiment of the present invention.

FIG. 6a shows another measurement and transduction circuit utilized in another embodiment of the invention, and employing a microprocessor based circuit to convert capacitance changes into signals representative of applied moment. Microprocessor 61 includes programmable outputs 61a–61e and 69, and input 610. Outputs 61a–61d are connected to electrodes 43a–43d, respectively. Output 61e is connected to reset switch 64 contained in integrator circuit block 62. Output 69 transmits signals representative of applied force to a controlled external device such as a machine tool or computer workstation device.

First electrodes 43a–43d, together with second electrodes 41a–1d, define variable capacitors which in a preferred embodiment are arrayed in a configuration like that illustrated in FIG. 4b. Variable capacitors collectively comprising first electrodes 43a–43d and second electrodes 41a–41d have a common terminal which is connected to summing input 68 of integrating operational amplifier circuit block 62.

Current source 63 is connected to summing input 68 of integrator block 62. The output of integrator 62 is connected to the input of voltage comparator 67, and the output of comparator 67 is connected to a timer input of microprocessor 61. Current source 63, integrator 62, comparator 67, and the timing element of microprocessor 61 combine to form an analog-to-digital (A/D) converter of the type known in the art as an integrating or slope A/D converter.

Microprocessor 61 applies modulation signals to first electrodes 43a–43d. The modulation signals are applied so that a charge proportional to the imbalance of oppositely disposed capacitor values is conveyed to capacitor 66 by the action of operational amplifier circuit 65, preferably having a high input impedance. The modulation signals are generally step waveforms of equal magnitude, and have, for oppositely disposed electrodes corresponding to a given measurement axis, equal magnitude and opposite polarity. For example, electrodes 43a and 43c correspond to measurement of force applied along one axis, so that electrode 43a is driven by a first step waveform, and electrode 43c is simultaneously driven by a second step waveform of equal magnitude and opposite polarity.

The microprocessor may perform a variety of additional functions, including generating signals that reset the conversion circuitry, measuring the imbalance of sets of capacitances that provide information on the several components of applied moment, correcting for offsets from zero such as thermal drift and mechanical hysteresis, and transmitting the information to controlled devices external to the transducer. The microprocessor preferably provides linear/non-linear transfer functions, and includes a provision for communication with external devices, so that external communication can select a transfer function which optimizes transducer control function. A microprocessor employed in the invention is the Intel 8051 8-bit single-chip microprocessor, which has a timer element and serial and parallel I/O ports.

The utilization of a microprocessor allows greater flexibility in the design of electrode geometry. A transducer according to the invention may, for example, be constructed with three electrodes, with the microprocessor performing vector calculations as necessary to generate outputs representative of applied moment.

Those practiced in the art will appreciate that numerous of the features shown can be used independently of others and in a variety of transducer forms and structures. Since changes may be made in the illustrated transducer without departing from the scope of the invention, all matter contained in the above description or shown in the accompanying drawings is to be interpreted as illustrative and not in a limiting sense.

The following claims are intended to cover all of the generic and specific features of the invention described herein and all statements of the scope of the invention which as a matter of language might be said to fall therebetween.

Having described the invention, what is claimed as new and secured by letters patent is:

1. A force-responsive capacitive transducer, comprising:
   first electrode means including a plurality of electrode regions;
   second electrode means spaced apart from the first electrode means and angularly deflectable in response to applied moment, for defining with the first electrode means a plurality of capacitors having capacitance variable with spacing, such spacing being differentially variable with angular deflection of said second electrode means;
   actuator means connected to said second electrode means and responsive to externally applied force, for applying moment to said second electrode means and varying the spacing between said first and second electrode means, whereby capacitance is varied; and
   diaphragm means, connected to said second electrode means, for elastically deflecting in response to moment applied to said second electrode means.

2. A transducer according to claim 1, wherein the first electrode means has a center and the electrode regions define a substantially symmetrical array of sectors about the center.

3. A transducer according to claim 1, further comprising:
   signal generating means responsive to the variable capacitance of the force to capacitance transducer means, for generating signals representative of force variations.

4. A transducer according o claim 3 wheein the signal generating means comprises first and second variable frequency oscillator means, each coupled to the transducer means and responsive to the capacitive value of each for providing first and second variable frequency signals representative of applied momemt; and means responsive to said first and second variable frequency signals for generating a third variable frequency signal representative of the difference between said first and second variable frequency signals.

5. A transducer according to claim 3, further comprising digital processor means, connected to said signal generating means, for controlling the signal generating means and processing signals generated by the signal generating means.

6. A force-responsive capacitive transducer, comprising:
flexible diaphragm means deflectable in response to a centrally applied moment, said flexible diaphragm means including first electrode means, such electrode means having at least two electrode regions;
second electrode means spaced apart from said first electrode means for defining with the first electrode means a plurality of capacitors having capacitance variable with spacing; and
actuator means for applying moment, connected to the flexible diaphragm means so that applied moment deflects the flexible diaphragm means and varies the spacing between the flexible diaphragm means and the second electrode means, whereby capacitance is varied.

7. A transducer according to claim 6, wherein the flexible diaphragm means has a center and the electrode regions define a substantially symmetrical array of plush sectors about the center of said diaphragm.

8. A transducer according to claim 6, further comprising:
signal generating means responsive to the variable capacitance of the force to capacitance transducer means, for generating signals representative of force variations.

9. A force-responsive capacitive transducer comprising:
flexible diaphragm means deflectable in response to a centrally applied moment, said flexible diaphragm means including first electrode means, such electrode means having at least two electrode regions;
second electrode means spaced apart from said first electrode means for defining with the first electrode means a plurality of capacitors having capacitance variable with spacing;
actuator means for applying moment, connected to the flexible diaphragm means so that applied moment deflects the flexible diaphragm means and varies the spacing between the flexible diaphragm means and the second electrode means, whereby capacitance is varied; and
signal generating means responsive to the variable capacitance of the force to capacitance transducer means, for generating signals representative of force variations, the signal generating means including
first and second variable frequency oscillator means, each coupled to the transducer means and responsive to the capacitive value of each for providing first and second variable frequency signals representative of applied moment; and
means responsive to said first and second variable frequency signals for generating a third variable frequency signal representative of the difference between said first and second variable frequency signals.

10. A force-responsive capacitive transducer comprising
flexible diaphragm means deflectable in response to a centrally applied moment, said flexible diaphragm means including first electrode means, such electrode means having at least two electrode regions;
second electrode means spaced apart from said first electrode means for defining with the first electrode means a plurality of capacitors having capacitance variable with spacing;
actuator means for applying moment, connected to the flexible diaphragm means so that applied moment deflects the flexible diaphragm means and varies the spacing between the flexible diaphragm means and the second electrode means, whereby capacitance is varied;
signal generating means responsive to the variable capacitance of the force to capacitance transducer means, for generating signals representative of force variations; and
digital processor means, connected to said signal generating means, for controlling the signal generating means and processing signals generated by the signal generating means.

11. A capacitive transducer for converting applied force to capacitive changes, comprising:
a substantially rigid support element;
a flexible diaphragm having a relatively rigid central region and a peripheral region affixed to said support element;
a plurality of first electrodes mounted on said flexible diaphragm;
actuator means attached to said central region of said flexible diaphragm;
second electrode means spaced apart from and affixed to said rigid central region of said diaphragm, for defining with said first electrode means an arrangement of capacitors, said capacitors having capacitance variable with spacing, and
so that angular deflection of the central region of the diaphragm relative to said support element differentially varies the spacings of said capacitors, whereby capacitance is varied and applied force is measured.

12. A transducer according to claim 11, wherein said plurality of first electrodes are mounted on said substantially rigid peripheral support.

13. A transducer according to claim 12, wherein ones of said plurality of first electrodes are also mounted on said flexible diaphragm.

* * * * *